(No Model.)
A. WILBUR.
FILTER.
No. 400,884. Patented Apr. 2, 1889.
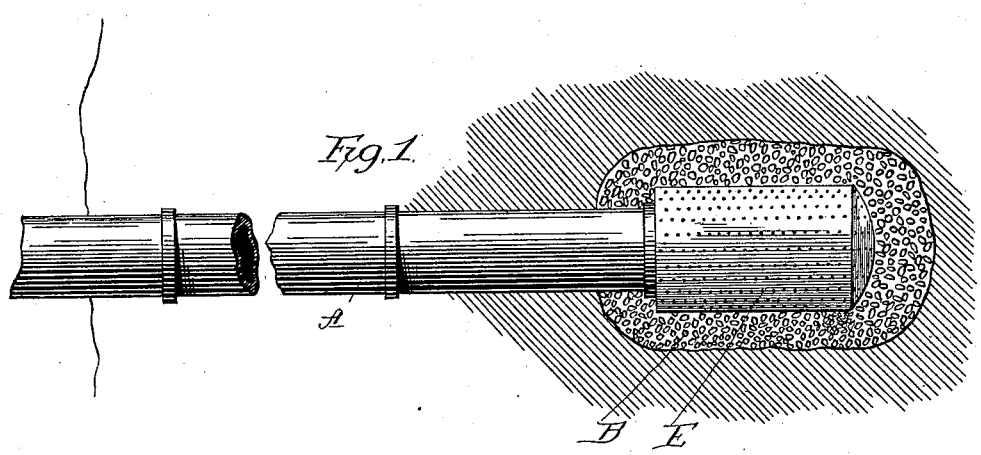
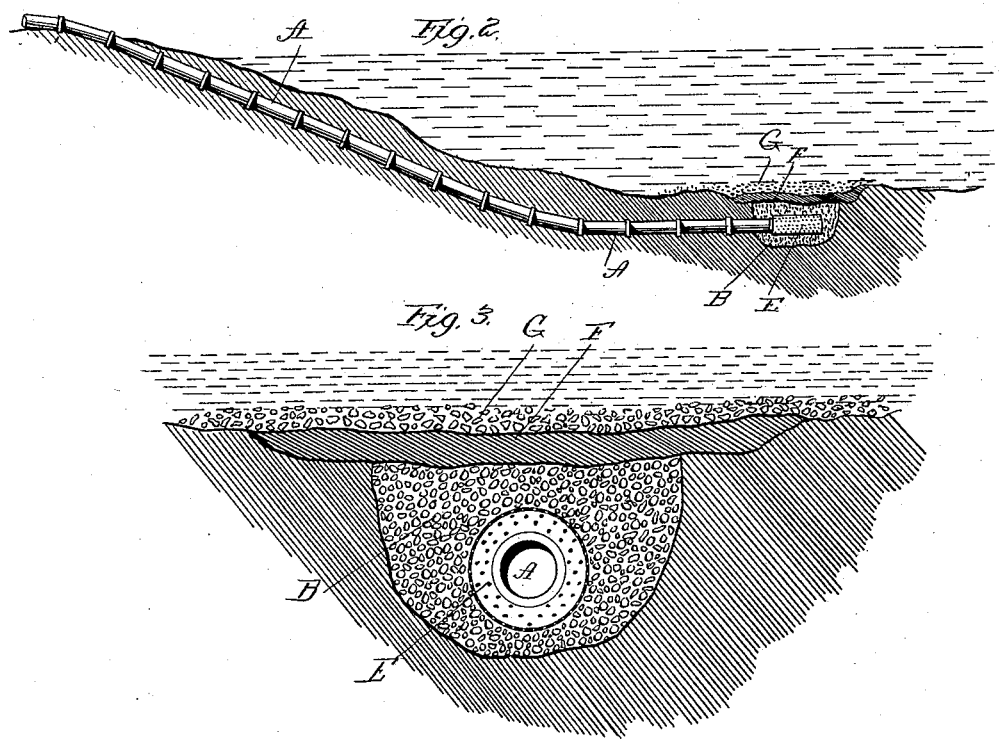
Attest.
Walter P. Keene.
F. L. Middleton
Inventor.
Alfred Wilbur.
by Ellis Spear,
Atty

UNITED STATES PATENT OFFICE.

ALFRED WILBUR, OF ALLEGHENY, ASSIGNOR OF ONE-HALF TO BENJAMIN H. LIGHTFOOT, OF PITTSBURG, PENNSYLVANIA.

FILTER.

SPECIFICATION forming part of Letters Patent No. 400,884, dated April 2, 1889.

Application filed December 4, 1888. Serial No. 292,612. (No model.)

*To all whom it may concern:*

Be it known that I, ALFRED WILBUR, of Allegheny, in the county of Allegheny and State of Pennsylvania, have invented a new and useful Improvement in Filters; and I do hereby declare that the following is a full, clear, and exact description of the same.

My invention is designed to filter water taken from a larger body for city and town consumption; and its object is to remove the impurities from the water as it is drawn to the conveying-pipe, which extends out in the stream or other body of water. My improved means for filtering is particularly adapted to filter the water of rivers and like streams where many impurities are present in the water from towns bordering on the banks thereof; but of course it can be also used in lakes or ponds.

In carrying out my invention I provide a pipe leading to a pump for forcing the water to a main reservoir or directly to the points of consumption. This pipe has a branch of suitable diameter and of a length sufficient to carry its outer end preferably into the channel of the stream. This pipe carries a strainer upon its end, which is preferably of larger diameter than the pipe itself. A pit is dug across the channel of the stream in the bottom of the river and this is filled in with gravel, so as to provide a bed of gravel for the strainer. This pit is filled in with gravel so as to cover the sides and top of the strainer to nearly the top of the pit, this gravel serving as a filtering medium to prevent the impurities in the water from penetrating to the strainer. In order to protect the top of the net and to exclude any impurities which might pass directly through the gravel to the pipe, I place a layer of clay on top of the gravel, of a suitable depth, a short distance below the top of the pit. Above this layer of clay I place another layer of gravel, which protects the layer of clay from the wash of the river. It will be understood that the layer of clay represents any material suitable for the purpose in this situation.

In the drawings, Figure 1 represents in plan a conveying-pipe and strainer and its surrounding filtering material. Fig. 2 shows the conveyer-pipe in side elevation and the bed of the river in section where the strainer is located. Fig. 3 shows a vertical section through the strainer and filtering material inclosed within the pit in the river-bed.

In the drawings, A represents the conveyer-pipe leading from the river-bed to the pump.

B represents the gravel around the pipe.

E is the strainer on the end of the pipe.

F is a layer of clay, and G is the second coating of clay.

If desired, a supplemental reservoir may be provided in the bank of the river, so that the water may run directly into it through the strainer and pipe and the forcing-pump may connect with this reservoir. It will thus be seen that as suction is applied the layer of clay prevents the flow of water directly downward through the mouth of the pit, and the water finds its way through the river-bed and the filtering material to the pipe.

I am aware that it has been heretofore suggested to utilize the bed of a river as a filtering material and to draw the water through said bed through a line of pipe extending to the shore and in connection with a suitable pump, and I do not broadly claim this as my invention.

What I do claim is—

1. The described filter, consisting of a pit or cavity formed in the river-bed, a line of pipe extending from said pit to a connection upon the shore, as a suitable pump, a strainer upon the end of said pipe located within the pit or cavity, filtering material surrounding said strainer, and a covering of clay across the top of said pit or cavity, substantially as described.

2. The described filter, consisting of a pit or cavity formed in the river-bed, a line of pipe extending from said pit to a connection upon the shore, as a suitable pump, a strainer upon the end of said pipe located within the pit or cavity, filtering material surrounding said strainer, a covering of clay across the top of said pit or cavity, and a covering material above the clay for protecting the same, substantially as described.

In testimony whereof I have signed my name to this specification in the presence of two subscribing witnesses.

ALFRED WILBUR.

Witnesses:
 LOUIS MOESER,
 FRANK HARBIG.